United States Patent [19]
Allen et al.

[11] Patent Number: 5,982,425
[45] Date of Patent: Nov. 9, 1999

[54] METHOD AND APPARATUS FOR DRAINING VIDEO DATA FROM A PLANARIZED VIDEO BUFFER

[75] Inventors: John Lewis Allen, Hillsboro; Leonard W. Cross; Bill A. Munson, both of Portland; Ali S. Oztaskin, Beaverton; Roger Traylor, Corvallis, all of Oreg.

[73] Assignee: Intel Corporation, Santa Clara, Calif.

[21] Appl. No.: 08/772,701

[22] Filed: Dec. 23, 1996

[51] Int. Cl.⁶ .............................. H04N 5/76; H04N 3/14; H04N 9/64

[52] U.S. Cl. ........................ 348/231; 348/281; 348/714; 348/717

[58] Field of Search ................... 348/238, 264, 348/281, 231, 233, 272, 711, 714–18

[56] References Cited

U.S. PATENT DOCUMENTS

| | | | |
|---|---|---|---|
| 5,253,062 | 10/1993 | Ohta | 358/160 |
| 5,295,077 | 3/1994 | Fukuoka | 358/479 |
| 5,428,389 | 6/1995 | Ito et al. | 348/231 |
| 5,550,597 | 8/1996 | Wada et al. | 348/708 |
| 5,581,311 | 12/1996 | Kuroiwa | 348/231 |
| 5,675,383 | 10/1997 | Yagasaki et al. | 348/390 |
| 5,731,852 | 3/1998 | Lee | 348/719 |
| 5,748,829 | 5/1998 | Yamamoto et al. | 386/46 |

*Primary Examiner*—Wendy Garber
*Assistant Examiner*—Jacqueline Wilson
*Attorney, Agent, or Firm*—Blakely, Sokoloff, Taylor & Zafman LLP

[57] ABSTRACT

A method and apparatus for draining video data from a planarized video buffer in a video camera. The method includes the steps of reading a first sequence of video data from a first plane of the planarized image buffer starting at a buffer address indicated by a first pointer, and then reading a second sequence of video data from a second plane of the planarized image buffer starting at a buffer address indicated by a second read pointer. The apparatus includes an address generation unit and a sequence counter. The address generation unit includes a number of read pointers each configured to indicate a memory location within a different data plane of a video buffer. The address unit is configured to address a sequence of memory locations in a video buffer starting at a location indicated by an active one of the read pointers. The sequence counter is configured to detect when a final memory location of the sequence of memory locations has been addressed by the address generation unit and, in response, to select a different one of the read pointers to be the active read pointer.

29 Claims, 6 Drawing Sheets

METHOD AND APPARATUS FOR DRAINING VIDEO DATA FROM A PLANARIZED VIDEO BUFFER

BACKGROUND OF THE INVENTION

(1) Field of the Invention

The present invention relates to video data processing. More specifically, the present invention relates to a method and apparatus for removing video data from a video buffer partitioned into a plurality of data planes.

(2) Art Background

The increased use of personal computers for video-teleconferencing has created a demand for inexpensive, low-power video cameras capable of feeding digital video data directly into a personal computer. A low-cost video front-end including an image sensor, an analog-to-digital (A/D) converter and a digital signal processor (DSP) can be used to generate digital video data, but due to bandwidth and availability limitations on the video transmission path in the recipient computer, it is often necessary to store the digital video data in a buffer until the video transmission path in the personal computer becomes available.

To maintain image integrity, it is desirable to buffer video data on a field-by-field basis. Unfortunately, it is not always possible to determine at the time storage of a video field begins whether there will be sufficient buffer space to hold the complete video field. This is because field storage and retrieval operations are interleaved so that the amount of memory available to store a given video field increases as field storage is ongoing. If the available memory space does not increase sufficiently to permit storage of the complete video field, the field must be discarded and the buffer memory used to store the incomplete video field must be deallocated to allow storage of a subsequent field.

Matters become more complicated when color video is involved. When video data for a color image is buffered, it is often desirable to store values representing different qualitative aspects of the image in distinct regions of a video buffer referred to as "data planes". For example, in a YUV formatted video signal, a repeating sequence of Y, U and V values is presented for storage in the video buffer. The Y values represent image luminance and are stored in a "Y-plane" of the video buffer, and the U and V values represent image chrominance and are stored, respectively, in a "U-plane" and a "V-plane" of the video buffer. After an entire video field has been received, the Y-plane contains all of the Y-values of the video field, and the U and V planes contain all of the U-values and V-values of the video field.

FIG. 1 illustrates a prior art method for draining a video buffer 100 partitioned into Y, U and V data planes 105, 110 and 115. After a complete video field of Y, U and V values has been stored in video buffer 100, the buffer 100 is drained one complete plane after another starting with the Y data plane and then continuing to the U and V data planes. A pointer element referred to as a "read pointer" is used to indicate the next location in the video buffer 100 to be read and is represented by arrow 120. The hashed area 125 of video buffer 100 represents the remainder of the values making up the video field and the non-hashed area 126 represents the portion of video buffer 100 already drained.

The primary disadvantage of the prior art buffer-drain technique is that the opportunity to concurrently drain one field and store another is limited. When a new video field is received for storage in buffer 100, the Y plane 105 is available to store incoming Y values and the U plane 110 is available to store at least some of the U-values. However, since V plane 115 is filled with data from a previous field, V-values from the new field cannot yet be stored. Since each line of video data output by the video front-end typically includes Y, U and V data, the inability to store V data means that the new field must be discarded. In fact, using the prior art technique, incoming video fields must continue to be discarded until the Y and U planes have been fully drained and the V plane at least partially drained.

One consequence of the reduced opportunity to concurrently drain and store video fields is an increase in the time between storage of successive fields. Increased time between storage of successive fields translates directly to lower data throughput and reduced buffer bandwidth.

Of course, increased concurrency between drain and store operations could be realized by increasing the size of buffer 100 so that at least two complete video fields could be stored in buffer 100 at once, but this would significantly increase the cost of the video camera.

Therefore, it is desirable to provide a method for draining a planarized buffer that maximizes the concurrency of field storage and retrieval operations to increase data throughput and increase buffer bandwidth, but without requiring the size of the buffer memory to be increased. This is accomplished by the method and apparatus of the present invention.

BRIEF SUMMARY OF THE INVENTION

A method and apparatus for draining video data from a planarized video buffer of a video camera are disclosed. Instead of a single read pointer, a separate read pointer is provided for each of the plurality of data planes used to store component values of a video field. Sequences of video data are read from each of the plurality of data planes starting at buffer addresses indicated by the read pointers corresponding to the planes. The sequence of video data read from each of the data planes is but a fraction of the total number of components of the video field stored in the plane. By iteratively draining a fraction of the video field components from each of the plurality of data planes, an entire video field is ultimately drained. Since the video field components stored in each plane are drained in fractional increments, storage of a successive video field can begin even though components of a previous video field remain in each of the plurality of data planes. The result is increased concurrency of data storage and retrieval, and, therefore, greater throughput of buffered video data.

An apparatus according to the present invention includes an address generation unit and a sequence counter. The address generation unit includes a plurality of read pointers, each configured to indicate a memory location within a respective one of the plurality of data planes in the buffer memory. The address generation unit is configured to address a sequence of memory locations in the buffer memory starting at a memory location indicated by an active one of the three read pointers. The sequence counter is configured to detect when a final location of the sequence of memory locations has been addressed and, in response, to select a different one of the plurality of read pointers to be the active read pointer.

DETAILED DESCRIPTION OF THE INVENTION

A method and apparatus for draining video data from a planarized video buffer are described below. Although numerous specific details are set forth in order to provide a thorough understanding of the present invention, it will be apparent to one skilled in the art that the present invention may be practiced without such specific details. For example, much of the description of the invention which follows involves draining YUV-formatted video data. It will be readily appreciated, however, that the present invention may be applied to drain video data stored in a planarized buffer regardless of data format.

Video Camera for Feeding Video Data Directly to a Computer.

Figure 2:
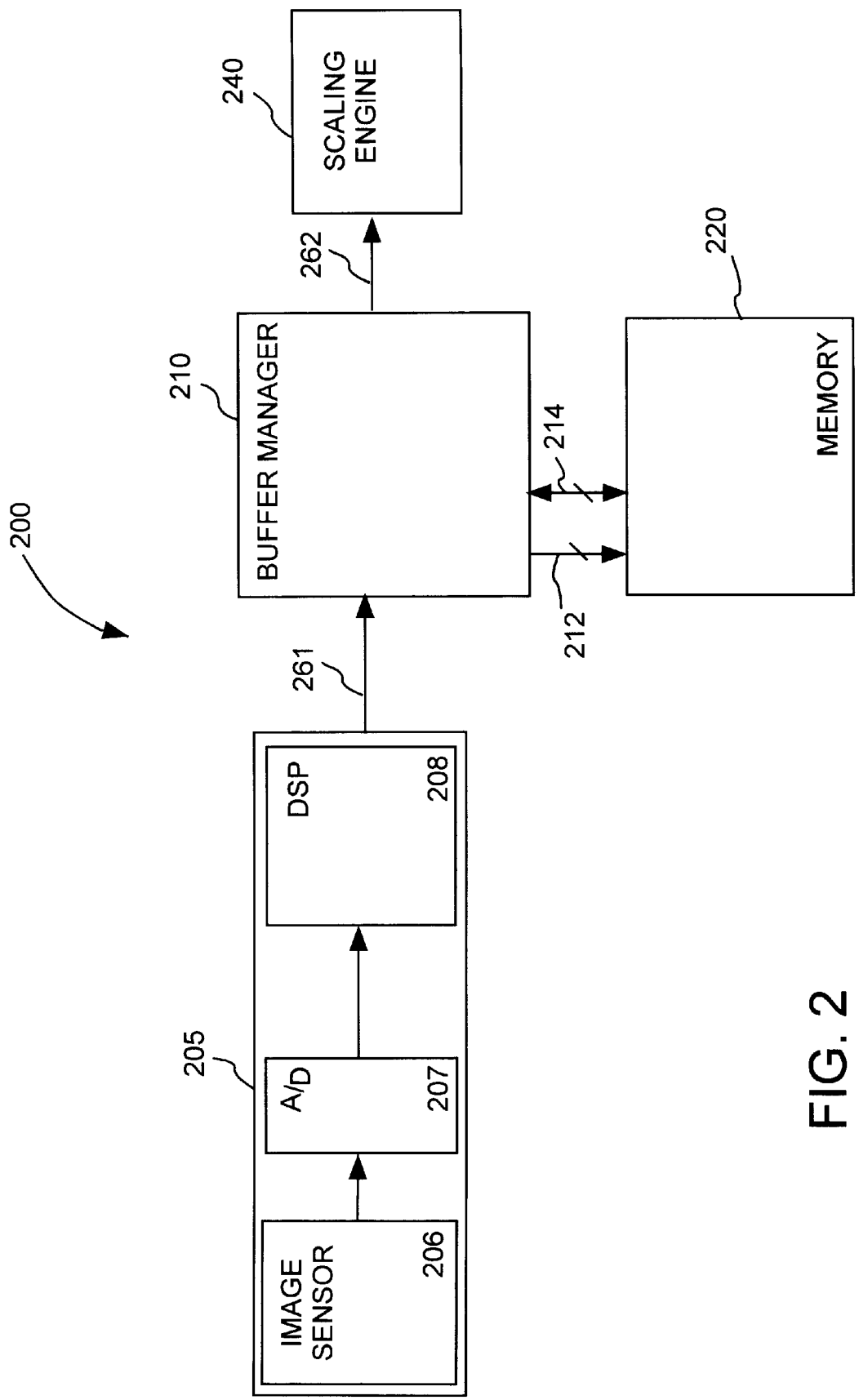
FIG. 2 depicts a block diagram of a video camera capable of feeding digitized video data directly into a personal computer.

FIG. 2 illustrates a video camera 200 for feeding digitized video data directly into a personal computer. Video camera 200 includes a video front-end 205, a buffer manager 210, a buffer memory 220 and a scaling engine 240. Video front-end 205 includes an image sensor 206, an analog-to-digital converter (ADC) 207 and a digital signal processor (DSP) 208.

Buffer manager 210 receives video data from the video front-end 205 at data input 261 and stores it in buffer memory 220. The video data is written to buffer memory 220 via data path 214 at buffer memory locations defined by address signals asserted on address lines 212. Later, buffer manager 210 retrieves the video data from buffer memory 220 via data path 214 from locations established by address signals asserted on address lines 212, and outputs the video data to scaling engine 240 via output path 262. After the video data has been scaled by scaling engine 240, it is output to a computer (not shown) for display, storage or further transmission.

Video Data Formats

Video camera 200 can be designed to output color video data in one of a number of different video formats depending on the video generation algorithm performed by DSP 208. Common formats include RGB (red-green-blue) and YUV. In both the RGB and the YUV data formats, each image pixel is represented by a set of component values. In the RGB format, for example, a three-byte value referred to as a "color word" is used to represent each image pixel captured by image sensor 206 and digitized by ADC 207. The three bytes respectively represent the intensity of the red, green and blue components of a pixel.

The YUV video format is commonly used instead of RGB because an image in the YUV format may be represented with less data. In a YUV-formatted image, the components of a pixel are separated into luminance data (Y) which carries most of the pixel brightness information, and chrominance difference data (U and V) which carries most of the pixel color information. Since the human eye is less sensitive to localized changes in color than to changes in brightness, the chrominance difference data can be subsampled to reduce the amount of information required to reproduce an image. In the image processing context, subsampling is the representation of multiple input pixel values with a single value. For example, by representing the U component of four contiguous pixels with a single U value and likewise representing the V component the same pixel set with a single V value, the number of Y, U and V values required to represent the four pixel set is reduced from 4*(Y+U+V)=12 to Y*4+U+V=6. This video format is referred to as "YUV12" because the average number of bits required to represent a pixel is twelve (assuming one byte per Y, U or V value). Since the average number of bits required to represent a pixel in RGB format is twenty-four, YUV12 epresents a 50% reduction in the bandwidth required to transmit the video data and a 50% reduction in the amount of buffer memory required to store a given image.

It will be appreciated that when U and V pixel components are subsampled, the ratio of Y, U and V components used to represent a video image is not 1:1:1, but some other ratio indicating a lower number of U and V components per Y component. In the YUV12 format, for example, where the U and V values are each subsampled from four pixels to one, the Y:U:V component ratio is 4:1:1. In the YUV1 6 format, where the U and V values are each subsampled from two pixels to one, the ratio Y:U:V is 2:1:1.

Generation of a YUV-Formatted Video Signal

Figure 3:
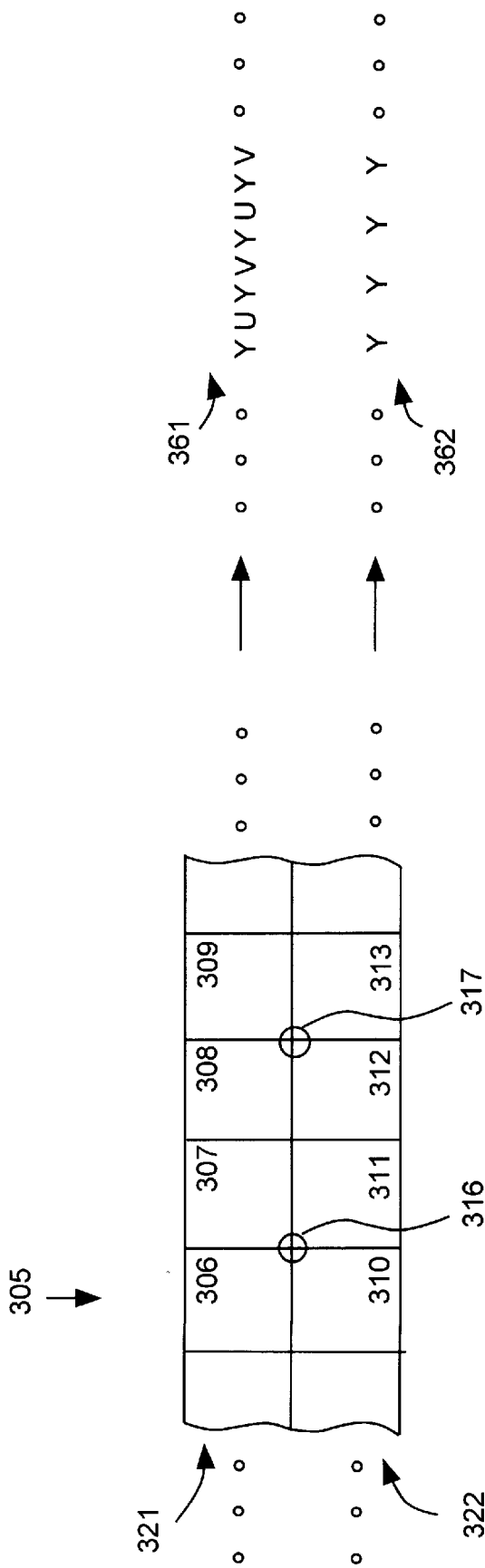
FIG. 3 illustrates a portion of an image sensor and sequence of video data resulting from the sampling thereof.

FIG. 3 illustrates the manner in which an image is sampled to generate a YUV12 video signal. A group of eight pixels 305 forming a portion of an image is shown. Pixels 306, 307, 308 and 309 are aligned along one row 321 of the image, known as a "scanline", while pixels 310, 311, 312 and 313 are aligned along another image scanline 322. To generate a YUV12-formatted video signal, it is necessary to subsample chrominance values of pixel group 305 in both the horizontal (along a scanline) and vertical directions. For example, a single pair of U,V values (one U component, one V component) is used to represent the chrominance values of the set of four pixels 306, 307, 310 and 311. Likewise, a single pair of U, V values is used to represent the chrominance values of the set of four pixels 308, 309, 312 and 313. Circles 316 and 317 are used to indicate the sets of pixels at which chrominance values are subsampled.

It will be appreciated that since pixel data representing an image is generally sampled along an image scanline, at least two scanlines must ordinarily be sampled before vertical subsampling can be performed. One way to achieve vertical subsampling is by buffering a scanline of video data in a fast access buffer and then mathematically combining the U,V components of the buffered scanline with the U,V components of the next scanline as they become available. Alternatively, the U,V components from every other scanline of the image could simply be dropped from the output video sequence.

Regardless of how vertical subsampling is accomplished, one characteristic of YUV12 data is that the data format of the output video signal changes from video line to video line. A video line is a sequence of video data framed by horizontal synchronization pulses. FIG. 3 illustrates the video lines 361 and 362 which result from the sampling of luminance values and the subsampling of chrominance values in pixel block 305. Due to subsampling in the vertical direction it is necessary for U,V components included in the video output sequence for row 361 to be used to represent the U,V component of the video output sequence for the successor row 362. In other words, video line 361, which corresponds to pixel row 321, includes U,V components so that the output sequence is in the format Y,U,Y,V, etcetera. By contrast, video line 362, which corresponds to pixel row 322, does not include U and V values and is represented by the sequence Y, Y, Y, etcetera. Thus, the pattern of Y, U and V values in a YUV12-formatted video signal alternates between YUYV and YY with each line of video data.

Because of the alternating component patterns between successive video lines, YUV12-formatted video data is cumbersome to scale. It is necessary to maintain the ratio of YUV components (e.g., 4:1:1) through the scaling process, but since scaling typically requires filtering of pixels in a row or column, scaling a YUV12-formatted video signal in the vertical direction, requires that the lack of U,V components in every other video line be accounted for. When implemented in a hardware apparatus such as an ASIC (application-specific integrated-circuit) for a video camera, tracking the location of pixel components in individual video lines can significantly add to the amount of transistors in the implementing logic.

To simplify scaling of YUV12 data, the Y, U and V components can be buffered in separate regions of the video buffer referred to as "video data planes" and then scaled as the buffer is drained. In this way, a sequence of exclusively Y, U or V values can be presented to the scaling engine.

Draining a Planarized Video Buffer

Figure 1:
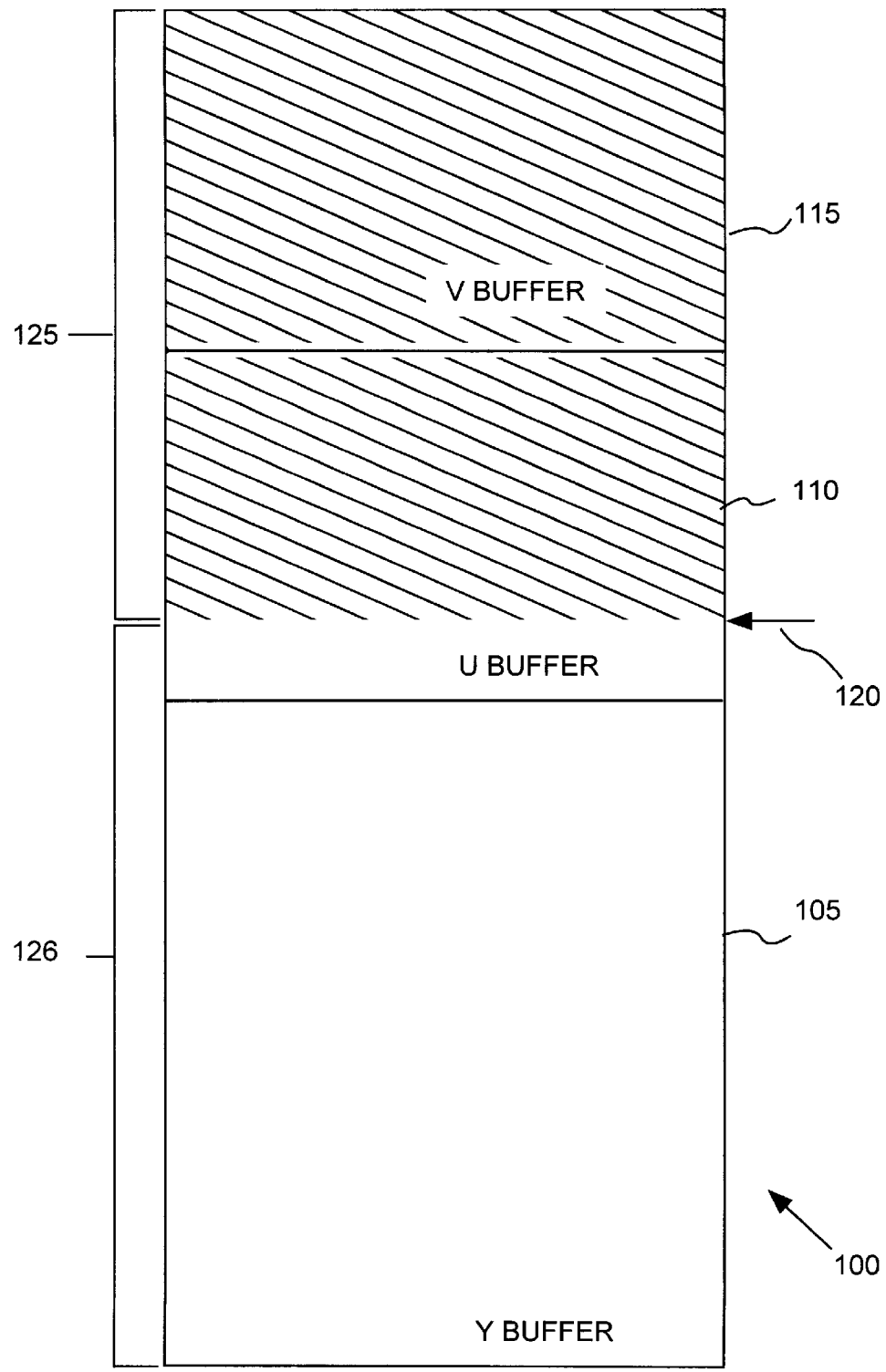
FIG. 1 illustrates a video buffer being drained according to the prior art.

FIG. 1 illustrates a video buffer that has been partitioned into a plurality of video data planes. Herein, the expression "data plane" refers to a group of memory locations within a video buffer defined by a starting and ending address. In the buffer of FIG. 1, region 105 is a data plane for holding luminance pixel components (Y components) and regions 110 and 115 are data planes for holding chrominance difference pixel components (U and V components, respectively).

As stated above, FIG. 1 depicts a video buffer 100 being drained according to the prior art. A pointer element (e.g., a register or counter) for indicating a location in the video buffer containing an image value yet to be read is indicated by arrow 120 and referred to as a "read pointer". According to the prior art, read pointer 120 is pointed at a starting location in buffer 100 and then incremented through a continous sequence of addresses until all of the data corresponding to a video field has been read.

Herein, the expression "video field" refers to a sequence of pixel values bounded by vertical synchronization pulses and representing an image sampled from an image sensor. In one type of image sensor, known as an "inter-line charge-coupled device" (interline CCD), two rows of photosites on the sensor are electrically summed when read so that, together, the two rows define a scanline of video data. The photosite rows paired to make up the scanlines of a interline CCD video field are alternated with each field. For example, in one video field, photosite rows 1- 2, 3-4, 5-6, etc., are paired in scanlines. In the next video field, photosite rows 2-3, 4-5, 6-7, etc., are paired in scanlines. One of the video fields is said to be the "even" video field and the other the "odd" video field. Together the even and odd video fields constitute a single video frame.

The acts of reading a video data value and incrementing the read pointer are collectively referred to as "draining" a video data value from the video buffer. Once a video data value has been drained from the video buffer, its storage location is available to receive subsequent video data. Of course, interleaved with the buffer read operations required to drain buffer 100, buffer write operations are performed to store a subsequent video field. Y, U and V values are sequentially presented for storage in the buffer 100 and each value is stored in a respective data plane.

One disadvantage of the continuous drain technique of the prior art is that the time over which drain and store operations can be concurrently performed (i.e., interleaved) is limited. Recall that the sequence of data being presented for storage in the video buffer 100 is a pattern of Y, U and V data. This means that in order to store an incoming field it is necessary to have storage space available in each of the three data planes 105, 110 and 115. Since the continous drain technique begins with one plane and all video field components from that plane are drained before video field components are drained from any of the other planes, it is not possible to store an incoming video field until planes 105 and 110 are completely drained and plane 115 is at least partially drained. Thus, even if the relative rates of data drain and data storage permitted a new video field to be stored concurrently with the drain of a previously stored field, the prior art drain technique significantly limits this concurrent operation.

The consequence of reduced drain and store concurrency is a reduction in the amount of data buffered in video buffer 100 per unit of time. Since the amount of data that can be read/written from video buffer 100 is otherwise limited only by the physical characteristics of the memory device, the inability to concurrently store and retrieve data from video buffer 100 results in a less efficient use of the available buffer bandwidth. From the standpoint of the overall camera operation, the result is a reduced number of video frames per second.

Draining a Planarized Buffer using Multiple Read Pointers

Figure 4:
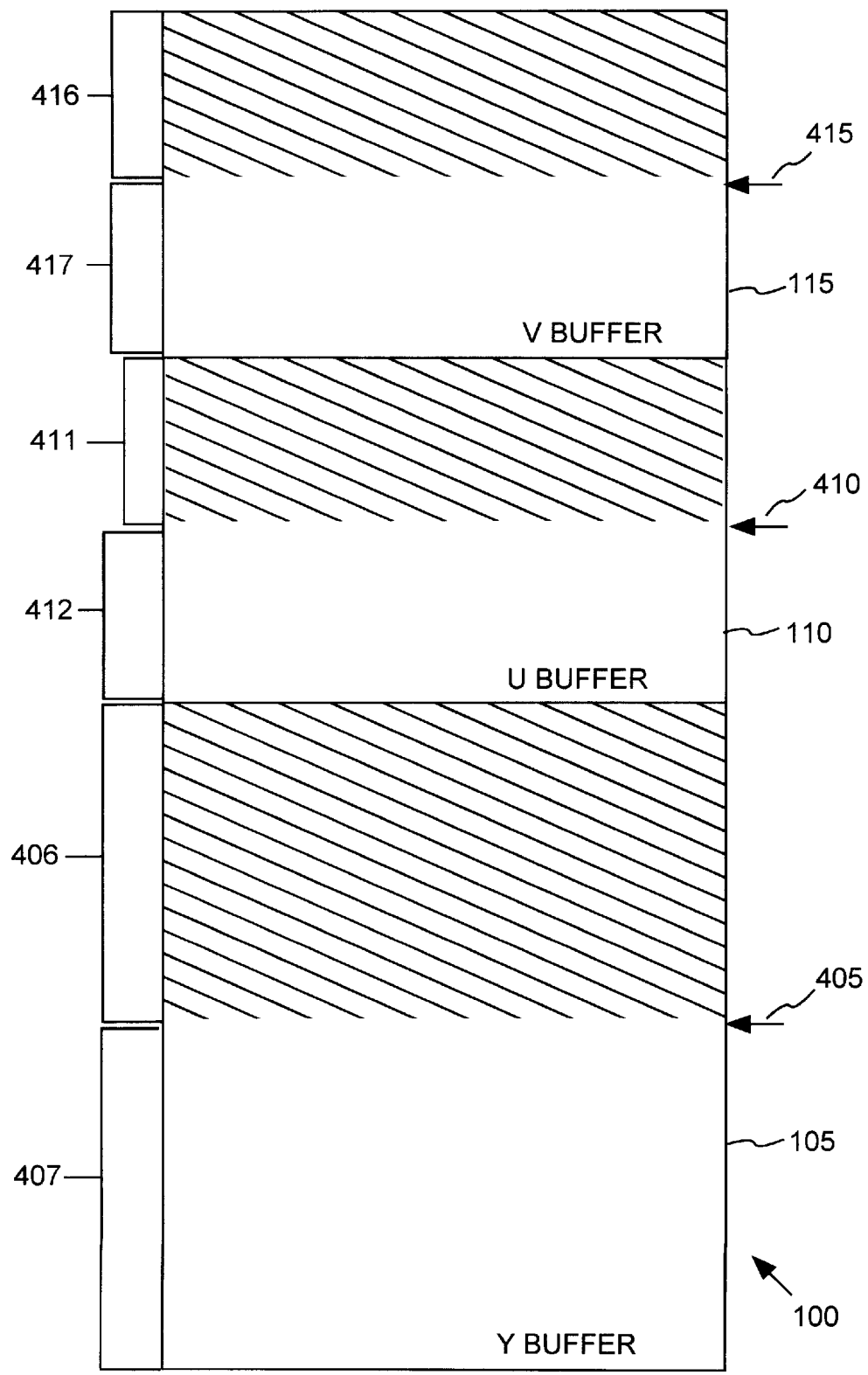
FIG. 4 illustrates a video buffer being drained according to the present invention.

FIG. 4 illustrates a buffer being drained according to the present invention. Instead of a single read pointer being continually incremented through the video buffer 100, three read pointers (405, 410 and 415) are used to incrementally drain the three planes of the video buffer 100 in round-robin fashion. An incremental portion of plane 105 is drained, an incremental portion of plane 110 is drained and then an incremental portion of plane 115 is drained. This incremental drain sequence is repeated to drain an entire video field. For example, if planes 105,110 and 115 are used to buffer Y, U and V components, respectively, of a YUV12-formatted video field, the video field can be drained by repeatedly draining 256 Y values from plane 105, 64 U values from plane 110 and then 64 V values from plane 115. From one perspective, the effect of incrementally draining each of the image planes in iterative fashion is to concurrently drain the components of a video field from each plane. By contrast, in the prior art continuous drain technique, the components of a video field are completely drained from one data plane before being drained from the next.

Each of the three read pointers (405, 410 and 415) is used to indicate the next location within a respective plane of video buffer 100 to be drained. After plane 105 has been partially drained, unread region 406 remains to be drained, but drained region 407 is available to receive components of an incoming field. Likewise, after planes 110 and 115 have been partially drained, regions 411 and 416 remain to be drained, but regions 412 and 417 are available to receive components of an incoming video field. Consequently, even if only a small portion of a video field has been drained from each of the data planes 105, 110 and 115, it is possible to begin storing an incoming video field.

Overview of a Method According to the Present Invention

Figure 5:
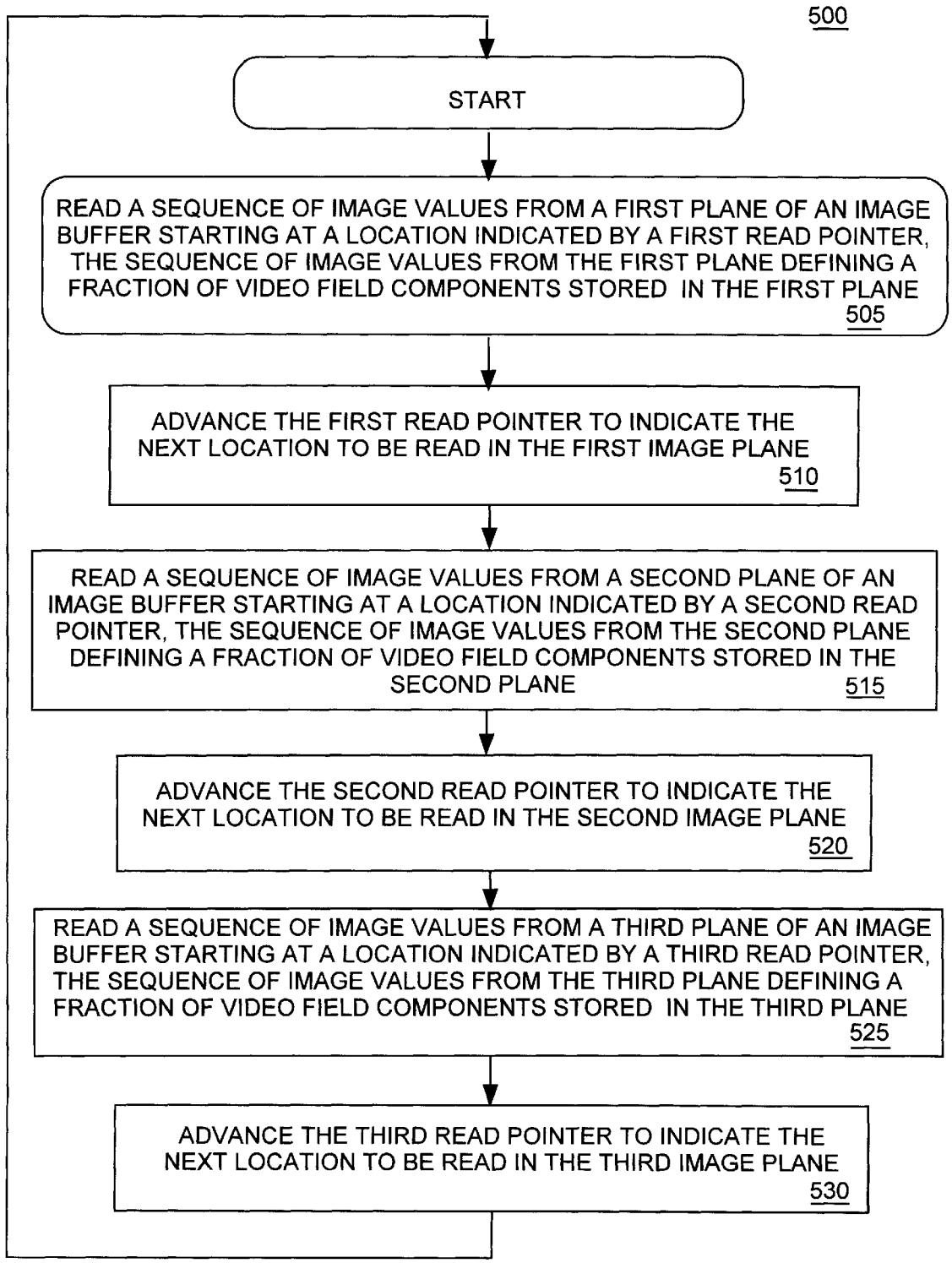
FIG. 5 illustrates a method for draining video data from a planarized buffer according to the present invention.

FIG. 5 illustrates a method 500 for draining a video field from a buffer memory in a video camera according to the present invention. At step 505, a sequence of video data is read from a first plane of the buffer starting at a location indicated by a first read pointer. The sequence of values is a fraction of the total number of components of the video field stored in the first plane. At step 510, the first read pointer is advanced to indicate the memory location in the first plane which immediately follows the sequence of values read in step 505. It will be appreciated that step 510 may be accomplished by incrementing the first read pointer after reading each value in the sequence of video data read in step 505 so that, after step 505 is complete, step 510 entails incrementing the first read pointer a final time. Alternatively, the first read pointer may continue to indicate the starting address of the sequence of values to be read during step 505 until after the entire sequence of values has been read, and then advanced at step 510. In either case, after step 510 is performed, the first read pointer indicates the next memory location in the first plane of the buffer to be read, either by pointing directly at the next memory location, or pointing at the location last read.

Of course, at some point it will be necessary to wrap the first read pointer around the end of its respective data plane. For example, if the first read pointer is incremented after each value is read from the first plane, at some point the top of the first plane will be reached and the step of advancing the first read pointer will include the step of resetting the first read pointer to the bottom of the first plane. The components of the video field stored in the first plane of the video buffer could also be stored in reverse order so that advancing the first read pointer involves decrementing the first read pointer after each value read. In that case, wrapping the first read pointer includes detecting when the first read pointer reaches the bottom of the first plane and then modifying the the first read pointer to indicate the top of the first plane.

At step 515, a sequence of video data is read from a second data plane of the image buffer starting at a location indicated by a second read pointer. The sequence of values is a fraction of the total number of components of the video field stored in the second plane, the fraction being equal to the fraction of components read from the first plane in step 505. For example, if the first plane of the image buffer contains the Y components of a YUV12-formatted video field, and the second plane contains U components of the video field, then the fraction of video field Y components read in step 505 will be equal to the fraction of the number of video field U components of in a video field read in step 515. Since the Y:U:V component ratio of a YUV12-formatted video field is 4:1:1, four times as many Y components are drained in step 505 as U values drained in step 515, yet the fraction drained of the total number of video field Y components and the fraction drained of the total number of video field U components is equal. In this way, each of the different YUV components of the video field are drained from their respective data planes at the same effective rate, and, when the last sequence of Y components in a video field is drained at step 505, the last sequence of U values in the video field will be drained at the next execution of step 515.

At step 520, the second read pointer is advanced to indicate the start of the next sequence of video data to be read from the second data plane. As stated above, this may be accomplished in a number of ways and may involve wrapping the read pointer around an end of the second data plane.

At step 525, a sequence of video data is read from a third plane of the image buffer starting at a location indicated by a third read pointer. Again, the sequence of values is a fraction of the total number of video field components stored in the third plane, and the fraction is equal to the fractions of components read from the first plane in step 505 and from the second plane in step 515. At step 530, the third read pointer is advanced to indicate the start of the next sequence of video data to be read from the third data plane.

After step 530, the steps of method 500 are repeated beginning at step 505. In this way, the pixel components of a video field are partially drained from their respective data planes in incremental drain steps. After a number of iterations of the steps of method 500, the video field is completely drained and drainage of a subsequent video field begins.

Apparatus for Draining a Planarized Video Buffer

Figure 6:
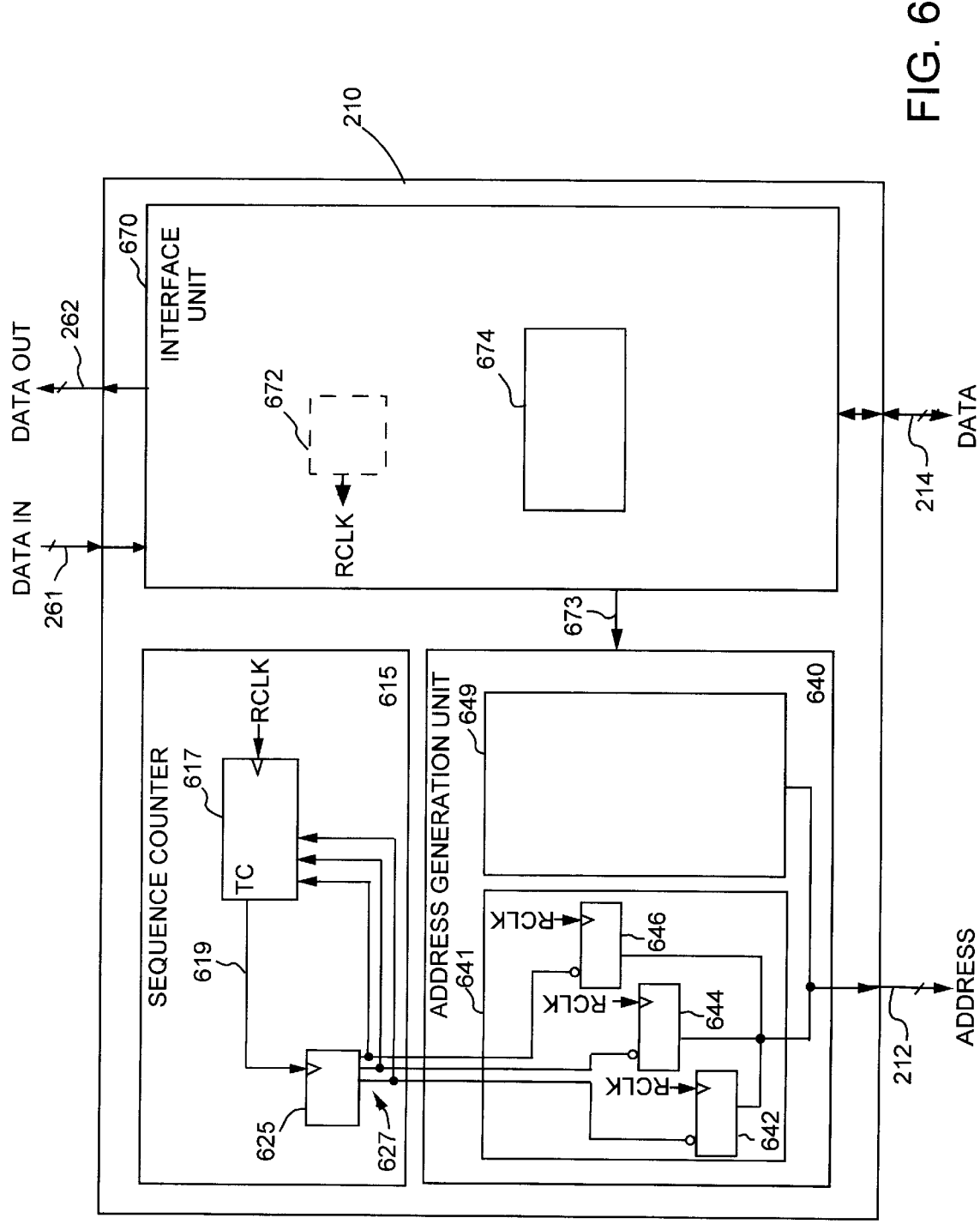
FIG. 6 depicts a buffer manager for draining a planarized buffer according to the method of the present invention.

FIG. 6 depicts an apparatus for draining a buffer memory according to the present invention and embodied in buffer manager 210. Buffer manager 210 includes an interface unit 670, a sequence counter 615 and an address generation unit 640.

Interface unit 670 receives data to be written to a buffer memory (not shown) via data input 261 and notifies address generation unit 640 via signal path 673 that a write address needs to be generated. In response, logic 649 within address unit 640 asserts an address signal on address lines 212. Interface unit presents the data to be written on data lines 214 and the data is written into buffer memory at the asserted address. The address asserted by logic 649 is alternated between the data planes of the buffer memory depending on whether the data to be written is Y, U or V data. It will be appreciated that, depending on whether a read or write operation is being performed on buffer memory, certain control signals, including write enable, read enable and output enable may need to be asserted. Herein, the act of addressing the buffer memory is to be construed as including assertion of any such control signals necessary to complete the write or read operation.

Interface unit may also include arbitration logic for arbitrating between buffer read and write operations. Ordinarily, since inability to write video data could result in a loss of video field integrity, data write operations are given priority over data read operations.

To drain data from the buffer memory, data is read from a buffer memory address asserted by one of the three read pointers (642, 644 and 646) within the read address logic 641 of address generation unit 640. The data output by the buffer memory is received in the interface unit 670 via data path 214 and output at data output path 262 to be scaled by a scaling engine or routed out of the video camera.

The read pointer used to address the buffer memory is referred to as the "active" read pointer and is determined by the output of selector logic 625. Selector logic 625 outputs a set of three selection signals 627, only one of which is active at any given time. Each selection signal of the set of three selection signals 627 is coupled to a respective one of the three read pointers 642, 644 and 646, and the read pointer receiving the active one of the set of three selection signals 627 is the active read pointer.

Selector logic 625 occasionally receives a terminal count signal 619 from down counter 617 and, in response, activates a different one of the set of three selection signals 627. This results in selection of a different active read pointer.

Down counter 617 also receives the set of three selection signals 627 and, based on which of the set of three selector signals is active, is reset to one of three predetermined count values. These predetermined count values correspond to the number of values to be drained from each plane of the buffer memory in accordance with steps 505, 515 and 525 of method 500 discussed above. It will be appreciated that instead of counting down from one of a set of predetermined numbers, counter 61 7 could also count up to one of a set of predetermined numbers, signaling selector logic 625 when the predetermined number is reached.

To control the reading of the buffer memory according to the method of the present invention, after every value read, a read clock signal (designated "RCLK" in FIG. 6) is cycled to both decrement the down counter 61 7 of sequence counter logic 615 and increment the address of the active read pointer (i.e., read pointer 642, 644 or 646). Note that, although each of the read pointers (642, 644 and 646) receive the read-clock signal, only the active read pointer is incremented.

Interface unit 670 includes a clock circuit 672 for generating the read-clock signal asserted at the clock inputs of down counter 617 and read pointers 642, 644 and 646. It will be appreciated that clock circuit 672 could be located elsewhere within buffer manager 210 or even external to buffer manager 210. Moreover, clock circuit 672 may be designed to output the read-clock signal only when enabled (by arbitration logic 674, for example), so that a sequence of buffer reads can be halted to allow buffer writes or dynamic refresh to the buffer memory.

It is helpful to consider the operation of buffer manager 21 0 by way of a specific example. Assume that down counter 617 has just been reset to a new program count and read pointer 642 has been newly activated. The address output by read pointer 642 is used to enable the contents of the buffer memory (not shown) onto data path 214 to be output from the buffer manager 210 by interface unit 670. At the next gating edge of the read-clock signal, sequence counter 617 is decremented and read pointer 642 is incremented. Each of the read pointers 642, 644 and 646 include logic to detect when the top of their respective data planes has been reached and to reset the address indicated by the read pointer to the bottom of the data plane. Even when this "wrap around" effect occurs, the read pointer is still considered to have been incremented. (It will be appreciated that a decrementing operation with a wrap from bottom to top could also be implemented.) After being incremented, the read pointer 642 indicates the next address within the data plane and the contents of this buffer memory location is enabled onto data path 214.

Read operations continue to be performed in the above-described manner until the down counter 617 reaches one. At the next gating edge of the readclock signal, the down counter 617 is zeroed and the terminal count signal 619 is asserted. The read pointer 642 is incremented, but thereafter selector logic 625 activates a different one of the set of three selection signals 627 so that read pointer 644 becomes the active read pointer and the down-counter 617 is reset to a count corresponding to the incremental number of values to be read from the data plane corresponding to read pointer 644. The sequence of read operations described above is now repeated based on addresses asserted by read pointer 644. When the terminal count signal 619 is next asserted, read pointer 646 is made the active read pointer, down-counter 617 is reset to a count corresponding to the incremental number of values to be read from the next data plane, and the next plane is drained based on addresses asserted by read pointer 646. Since only the active read pointer is incremented at the gating edge of the read clock signal, the inactive read pointers continue to indicate the next value to be read from their respective data planes.

By confining each of the read pointers to cycle through a different data plane, and by choosing predetermined program counts according to the relative number of component values in each data plane, buffer manager 210 is able to incrementally drain each of the data planes in a buffer memory. As a result, storage of an incoming video field can begin as soon as a few lines of data are drained from each of the data planes.

It will be appreciated that the recipient of the data output by apparatus 600 of FIG. 6 must be able to distinguish between the Y, U and V data values. In one embodiment of the present invention the YUV data output by apparatus 600 is received by a personal computer via a Universal Serial Bus (USB) and stored in a data buffer. A software program executed by the computer retrieves the data and further processes it for presentation on a video display or for communication via a computer network to another computer. To enable the computer to distinguish between the Y, U and V data values, a synchronization signal is transmitted by the device incorporating apparatus 600 to the recipient computer to indicate the start of each new video field. Since YUV data is received in a pre-determined format for each new video field (e.g., repeating sequences of 256 Y values, 64 U values and 64 V values), the synchronization signal enables the computer to correctly identify each incoming data value as Y, U or V data.

Alternate methods may be employed to enable a recipient computer to distinguish between Y, U and V data values without departing from the spirit and scope of the present invention. For example, separate pipes within the USB may be used to send the Y, U and V data values. In the context of the USB, pipes are a logical abstraction allowing a USB device to direct data addressed to the USB device to different device endpoints. If separate pipes are used, the incremental sequences of Y, U and V values need not be at a fixed size, but could instead vary based on the rate of data consumption by the recipient computer. Also, the recipient computer can distinguish between Y, U and V data values based on the pipe at which a given data value is received.

A method and apparatus for draining video data from a planarized video buffer are thus described. While the present invention has been described in particular embodiments and through particular examples, the present invention should not be construed as limited by such embodiments and examples, but rather construed according to the following claims.

What is claimed is:

1. A method for retrieving video data from a planarized image buffer, the method comprising:
    reading video data from respective starting portions of a plurality of planes of the planarized image buffer during a first time interval; and
    reading video data from respective remaining portions of the plurality of planes of the planarized image buffer during a second time interval.

2. The method of claim 1 wherein reading video data from the respective starting portions of the plurality of planes comprises reading a sequence of luminance values, each luminance value indicating brightness of one or more pixels in a video image.

3. A method for reading image data from an image buffer partitioned into a plurality of data planes, said method comprising the steps of:
    reading a portion of a first plurality of video data values stored in a first data plane of the plurality of data planes; and
    reading a portion of a second plurality of video data values stored in a second data plane of the plurality of data planes before reading a remaining portion of the first plurality of video data values.

4. The method of claim 3 wherein said step of reading a portion of a first plurality of video data comprises the step of reading a number of luminance values defining a fraction of the number of luminance values contained in a video field.

5. The method of claim 4 wherein said step of reading a portion of a second plurality of video data comprises the step of reading a number of chrominance values defining a fraction of the number of chrominance values of a first type contained in the video field, the fraction of the number of chrominance values of the first type equaling the fraction of the number of luminance values.

6. The method of claim 5 wherein said step of reading a number of chrominance values comprises the step of reading a number of type-U chrominance values defining a fraction of the number of type-U chrominance values contained in the video field.

7. A method for draining video data defining a video field from a video buffer partitioned into a plurality of data planes, said method comprising the steps of:

partially draining video data defining the video field from each of the plurality of data planes over a first time interval; and draining remaining video data defining the video field from each of the plurality of data planes over a second time interval.

8. The method of claim 7 wherein said step of partially draining video data defining the video field from each of the plurality of data planes comprises the steps of:

draining luminance data from a first data plane of the plurality of data planes; and draining chrominance data from a second data plane of the plurality of data planes.

9. The method of claim 8 wherein said step of draining luminance data from a first data plane of the plurality of data planes comprises the steps of:

reading a sequence of luminance values from the first data plane starting at an address in the first data plane indicated by a first read pointer; and modifying the first read pointer to indicate luminance values remaining in the first data plane.

10. The method of claim 9 wherein said step of draining chrominance data from a second data plane of the plurality of data planes comprises the steps of:

reading a sequence of chrominance values from the second data plane starting at an address in the second data plane indicated by a second read pointer; and modifying the second read pointer to indicate chrominance values remaining in the second data plane.

11. The method of claim 10 wherein said step of reading a sequence of chrominance values from the second data plane comprises the step of reading a plurality of chrominance values, each chrominance value of the plurality of chrominance values corresponding to at least one luminance value of the sequence of luminance values from the first data plane.

12. The method of claim 8 wherein said step of draining luminance data from a first data plane comprises the step of reading a number of luminance values from the first data plane defining a fraction of the number of luminance values in the video field, and wherein said step of draining chrominance data from a second data plane comprises the step of reading a number of chrominance values from the second data plane defining a fraction of the number of chrominance values of a first type in the video field the fraction of the number of chrominance values of a first type equalling the fraction of the number of luminance values.

13. The method of claim 1 wherein reading video data from respective starting portions of the plurality of planes comprises reading video data from respective buffer addresses pointed to by a plurality of read pointers.

14. The method of claim 13 wherein reading video data from respective remaining portions of the plurality of planes comprises reading video data from respective buffer addresses pointed to by the plurality of read pointers after the plurality of read pointers have advanced past the respective starting portions of the plurality of planes.

15. The method of claim 13 wherein reading video data from respective starting portions of the plurality of planes comprises advancing a first read pointer of the plurality of read pointers after each datum of video data is read from a starting portion of a first plane of the plurality of planes.

16. The method of claim 1 further comprising writing video data to the plurality of data planes during the first time interval.

17. An apparatus for retrieving video data from a memory partitioned into a plurality of data planes, said apparatus comprising:

an address generation unit including a plurality of read pointers that point to memory locations in respective planes of the plurality of data planes;

said address generation unit being configured to activate each of the plurality of read pointers in a sequence to produce interleaved reading of the plurality of data planes.

18. The apparatus of claim 17 wherein the apparatus is included within a video camera.

19. The apparatus of claim 17 further comprising a sequence counter coupled to said address generation unit, said sequence counter being configured to determine when a predetermined number of video data values have been read from one of the plurality of data planes and to signal the address generation unit to activate a different one of the plurality of read pointers.

20. The apparatus of claim 19 wherein the predetermined number is a first number when the activated one of the plurality of read pointers points within a data plane containing luminance values, and the predetermined number is a second number when the activated one of the plurality of read pointers points within a data plane containing chrominance values.

21. The apparatus of claim 20 wherein the first number is a fraction of the number of luminance values in a video field and the second number is a fraction of the number of chrominance values of a first type in the video field, the fraction of the number of luminance values being equal to the fraction of the number of chrominance values of a first type.

22. The apparatus of claim 17 wherein luminance data is stored in a first one of the plurality of data planes, chrominance data of a first type is stored in a second one of the plurality of data planes and chrominance data of a second type is stored in a third one of the plurality of data planes.

23. The apparatus of claim 22 wherein chrominance data of the first type, chrominance data of the second type and luminance data are stored in said memory in proportion to the respective portions of chrominance data of the first type, chrominance data of the second type and luminance data in a video field.

24. An apparatus comprising:

an image buffer that includes a plurality of planes of video data;

an address generation unit coupled to the image buffer, said address generation unit including a plurality of read pointers that point, respectively, to the plurality of planes of video data, the address generation unit being configured to advance the plurality of read pointers in an interleaved manner to read video data from respective starting portions of the plurality of planes of video data during a first time interval and to read video data from respective remaining portions of the plurality of planes of video data during a second time interval.

25. The apparatus of claim 23 wherein at least one of the plurality of planes is used to store luminance values and at least one of the plurality of planes is used to store chrominance values.

26. An apparatus for writing video data to a video buffer that includes a plurality of data planes, said apparatus comprising:

an address generation unit including a plurality of write pointers that point to memory locations in respective planes of the plurality of data planes;

said address generation unit being configured to activate each of the plurality of write pointers in a sequence to interleave writing of the plurality of data planes.

27. A method for filling video data defining a video field into a video buffer that is partitioned into a plurality of data planes, said method comprising:

partially filling video data defining the video field into each of the plurality of data planes during a first time interval; and filling remaining video data defining the video field into each of the plurality of data planes during a second time interval.

28. The method of claim 27 wherein said step of partially filling video data defining the video field into each of the plurality of data planes comprises:

filling luminance data into a first data plane of the plurality of data planes; and filling chrominance data into a second data plane of the plurality of data planes.

29. The method of claim 28 wherein said step of filling luminance data into a first data plane comprises writing into the first data plane a number of luminance values that define a fraction of the number of luminance values in the video field, and wherein filling chrominance data into a second data plane comprises writing into the second data plane a number of chrominance values that define a fraction of the number of chrominance values of a first type in the video field, the fraction of the number of chrominance values of a first type equaling the fraction of the number of luminance values.

\* \* \* \* \*

UNITED STATES PATENT AND TRADEMARK OFFICE
CERTIFICATE OF CORRECTION

PATENT NO.    : 5,982,425
DATED         : November 9, 1999
INVENTOR(S)   : Allen et al.

It is certified that error appears in the above-identified patent and that said Letters Patent is hereby corrected as shown below:

Column 4,
Line 12, delete "epresents", insert -- represents --.

Signed and Sealed this

Twenty-second Day of April, 2003

JAMES E. ROGAN
*Director of the United States Patent and Trademark Office*